May 3, 1966 J. V. SCHMITZ ETAL 3,248,758
MOLD FOR THE MANUFACTURE OF POLYURETHANE FOAM ARTICLES
Filed May 15, 1964

INVENTORS
JOHN V. SCHMITZ
& JAMES R. THOMAS
BY Walter E. Kule
THEIR ATTORNEY

United States Patent Office 3,248,758
Patented May 3, 1966

3,248,758
MOLD FOR THE MANUFACTURE OF POLY-
URETHANE FOAM ARTICLES
John V. Schmitz and James R. Thomas, both of Louisville, Ky., assignors to General Electric Company, a corporation of New York
Filed May 15, 1964, Ser. No. 367,738
1 Claim. (Cl. 18—42)

The present invention relates to molds and is more particularly concerned with an improved mold for manufacturing polyurethane foam articles.

Molds for the manufacture of a polyurethane foam body of definite or predetermined shape are required to withstand moderate pressures exerted by the foam during the formation thereof without excessive distortion of the mold surfaces and to release the body after curing thereof. Conventional molds for such uses have been constructed from reinforced plywood, epoxy plastic resins, aluminum, steel and chrome plated metals and have been expensive to make and difficult to fabricate. Also the surfaces of such molds have required treatment with a mold release agent to release the formed foam body. There has been a substantial problem in finding mold release agents that are both effective and long lasting.

An object of the present invention is to provide a low cost mold for molding polyurethane foam articles including a liner or molding surface inherently possessing good mold release properties.

Another object of the invention is to provide a low cost mold for molding polyurethane articles composed of heat insulating materials which will not materially interfere with the exothermic reaction which takes place during foaming and curing of a foamable polyurethane resin.

Further objects and advantages of the present invention will become apparent as the following description proceeds and the features of novelty which characterize the invention will be pointed out with particularity in the claims annexed to and forming part of this specification.

In carrying out the objects of the present invention, there is provided a mold member of sandwich construction comprising a mold release film in the form of a plastic sheet liner and a reinforcing member bonded and a rigid resin foam backing material together by means of a rigid plastic foam core. The surface of the plastic sheet liner in contact with the foamed resin material, and if necessary the surface of the backing material, are suitably treated to provide adhesion thereof to the resin foam.

Figure 1:
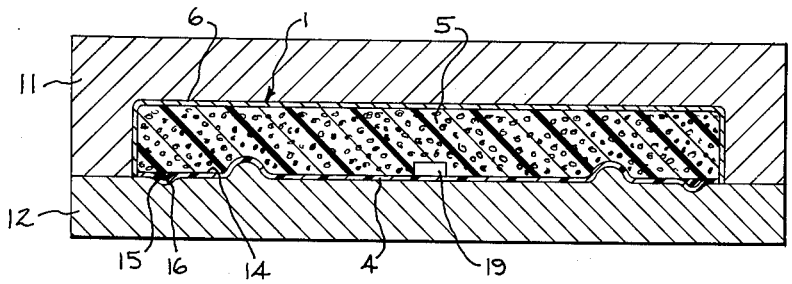
Figure 2:
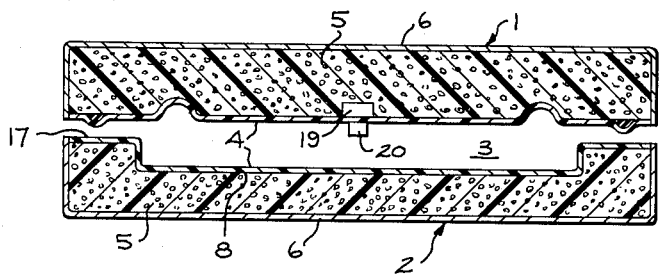
Figure 3:
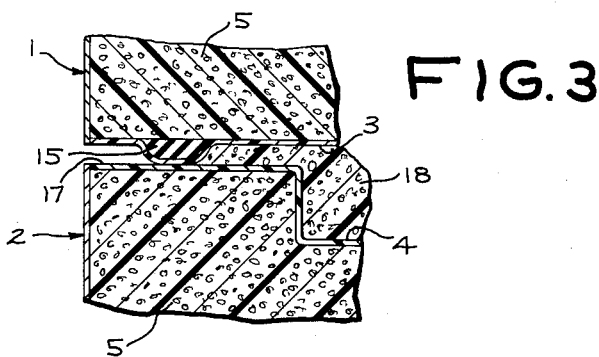

For a better understanding of the invention reference may be had to the accompanying drawing in which:

FIGURE 1 is a sectional view of means illustrating the manufacture of a mold of the present invention, FIGURE 2 is a sectional view of one embodiment of the mold of the present invention in the open position; and FIGURE 3 is an enlarged view of a portion of the mold of FIGURE 2 in the closed position.

With reference to the accompanying drawing and particularly to FIGURE 2 thereof, there is illustrated one embodiment of the present invention in the form of a mold comprising an upper mold member 1 and a lower mold member 2 which cooperate to form a mold cavity 3. In the illustrated mold, each of the mold members 1 and 2 comprise a liner or cavity forming surface 4 formed from a sheet of plastic material to which a polyurethane foam will not adhere. A resin foam core 5 is provided for supporting the liners 4 and the pan-shaped panels 6 of any suitable rigid material provide the necessary strengths for each of the mold members 1 and 2. As will be more fully described hereinafter, the liner 4 is permanently bonded to the foam backing material 5 which in turn is bonded to the member 6. The foamed material 5 provides low thermal conductivity so as to prevent loss of heat from the urethane foam being molded during foaming and curing thereby leading to a better quality foam product.

The liner or liners 4 are composed of any suitable plastic material having the property of not adhering to the foamed product being molded in the cavity 3. Preferably the liners are made from fluorocarbon films having this property. One suitable film is a copolymer of tetrafluoroethylene and perfluoropropylene and is sold as Teflon FEP by E. I. du Pont de Nemours Company, Inc. Another suitable film is an interpolymer of trifluorochloroethylene and sold as Aclar by General Chemical Division of Allied Chemical Corporation. Films of these copolymers do not adhere to polyurethane foams and this mold release property has been found to be permanent permitting long periods of usage of the molds of the present invention. However, by suitably treating the rear surface of such films, they can be rendered adhesive to the foam resin core or backing material 5. These treatments, which are well known, involve either exposure of the surface which is to be rendered adhesive to an ionizing radiation or corona or a treatment of the surface with a molten alkali metal or sodium amide.

The foam backing material or core 5 may consist of any rigid foam that will provide sufficient support for the liners 4. A satisfactory material for this purpose is a rigid polyurethane foam. The core 5 should be sufficiently rigid to resist failure in compression, flexure or shear and possess enough toughness, dimensional stability and chemical resistance to prevent damage to the liner 4 during handling or operation of the mold. For most satisfactory operation, the reinforcing resin foam forming the core 5 should be foamed-in-place so that during foaming it becomes adhered to the rear surface 8 of the liner 4 which has previously been treated to render it adhesive to the foam.

The formation of rigid cellular or foam polyurethane resins from either liquid polyester or polyether polyurethane reaction mixtures is well known. The polyester polyurethane resins, for example, as made by reacting a slightly branched polyester with a di-isocyanate or by reacting a linear polyester with a mixture of di- and tri-isocyanates to form cross linked, rigid or solid resinous products. By including a slight excess of di-isocyanate and a small amount of water, reaction of the isocyanate with the water will generate carbon dioxide as a foaming or expansion gas. Alternatively a halogenated alkane may be dispersed or dissolved in one or both of the reactants so that vaporization thereof by the heat of the resin forming reaction will provide the desired foam structure. Suitable catalysts or activators are of course also included in the reaction mixture.

In FIGURE 1 of the drawing, there is illustrated a master mold representative of the type which can be employed in making the mold members 1 and 2. Such a mold may comprise metal or plywood members 11 and 12, the member 12 having a surface 14 shaped to provide the desired shape for one of the liners 4 in the finished mold. A sheet of the suitable fluorocarbon resin is placed on the surface 14 and is vacuum formed or otherwise shaped to provide a mold liner 4 conforming to the shape of the surface 14. Either prior to or after this operation, the exposed or upper surface of the sheet is treated to render it adhesive to the polyurethane foam comprising the core 5. The reinforcing panel 6 supported by the mold member 11 is then brought into contact with the edges of the fluorocarbon sheet. With the members 11 and 12 in a closed position there is introduced into the space between the film 4 and the member 6, a suitable polyurethane reaction mixture adapted to form a rigid foam core 5. The foam 5 adheres to both the inner or rear surfaces of the film 4 and also to the inner surfaces of the member 6 during the foaming thereof. After the foam has cured to a solid or rigid form, the sandwich mold member is ready for use.

If desired, one or both of the mold members 1 and 2 may also include a flexible gasket arrangement to prevent leakage of the material being foamed therein during the mold operation. This gasket generally indicated by the numeral 15 forms an integral part of the mold and is incorporated into the liner during the manufacture of the mold member. More specifically, for example, the liner 4 may include a recess 16 for receiving a resilient gasket 15 of rubber or the like which in the final product will be contained between the liner 4 and the foamed backing material 5. The gasket 15 is placed in recess 16 prior to the formation of the core 5 during the formation of the core 5, the gasket is firmly anchored in recess 16 by the core material.

During the use of the mold the gasket 15, forming part of mold member 1, by contact with the flange surface 17 of the opposite mold member 2 provides a tight seal between the two mold members thereby preventing escape of the polyurethane foam products 18 being molded within the cavity 3. Thus, as shown in FIGURE 3, the only mold surfaces exposed during molding operations to the body 18 are those surfaces of the liners 4 which have the property of not adhering to the body 18. Accordingly, the body 18 can be readily separated from the mold surfaces and removed from the mold.

In accordance with a further aspect of the present invention, there is provided in combination with the sandwich mold member, magnetic means for positioning and anchoring one or more magnetic inserts adapted to form part of the molded body 18. Such a means is shown in the drawing as a permanent magnet 19 for positioning a magnetic insert 20 on the surface 4 so that during the foaming of the body 18, this insert becomes embedded in that body. This is made possible by the fact that the mold member, or at least the core 5 and the liner 4, are non-magnetic. It is obvious that a suitable electromagnet can be substituted for the permanent magnet 19.

While there has been shown and described a specific embodiment of the present invention it will be understood that it is not limited thereto and it is intended by the appended claim to cover all such modifications as come within the true spirit and scope of the invention.

What we claim as new and desire to secure by Letters Patent of the United States is:

A mold for molding and curing a resin foam article comprising:
 cooperating mold members forming a mold cavity and having mating flange portions,
 each of said members including a flexible plastic sheet material having the property of not adhering to the cured resin foam,
 a reinforcing means spaced from said sheet,
 said sheet material forming the cavity and mating flange surfaces of said member,
 a layer of thermally insulating rigid foamed plastic material between said liner and said reinforcing means for supporting said sheet against pressures generated in the mold cavity,
 the surface of said liner forming sheet in contact with said layer of foamed plastic being treated to provide adhesion thereof to said foamed plastic,
 at least one of said members including a resilient sealing gasket in the mating flange thereof,
 said gasket being contained between said sheet material and said foamed plastic material.

References Cited by the Examiner

UNITED STATES PATENTS

| | | | |
|---|---|---|---|
| 1,544,828 | 7/1925 | Fuchs | 249—134 |
| 2,024,092 | 12/1935 | Cox | 18—47 X |
| 2,333,699 | 11/1943 | Schoonover et al. | 18—47 |
| 2,403,476 | 7/1946 | Berry et al. | |
| 2,524,737 | 11/1950 | Sawyer. | |
| 2,632,922 | 3/1953 | Kish. | |
| 2,731,669 | 1/1956 | Talalay | 18—42 |
| 2,734,227 | 2/1956 | Costick et al. | 18—42 X |
| 2,770,013 | 11/1956 | Crooker. | |
| 2,779,057 | 1/1957 | Graham et al. | |
| 2,872,703 | 2/1959 | Jordon | 18—42 X |
| 3,018,520 | 1/1962 | Renaud. | |

WILLIAM J. STEPHENSON, *Primary Examiner.*